Patented Sept. 13, 1927.

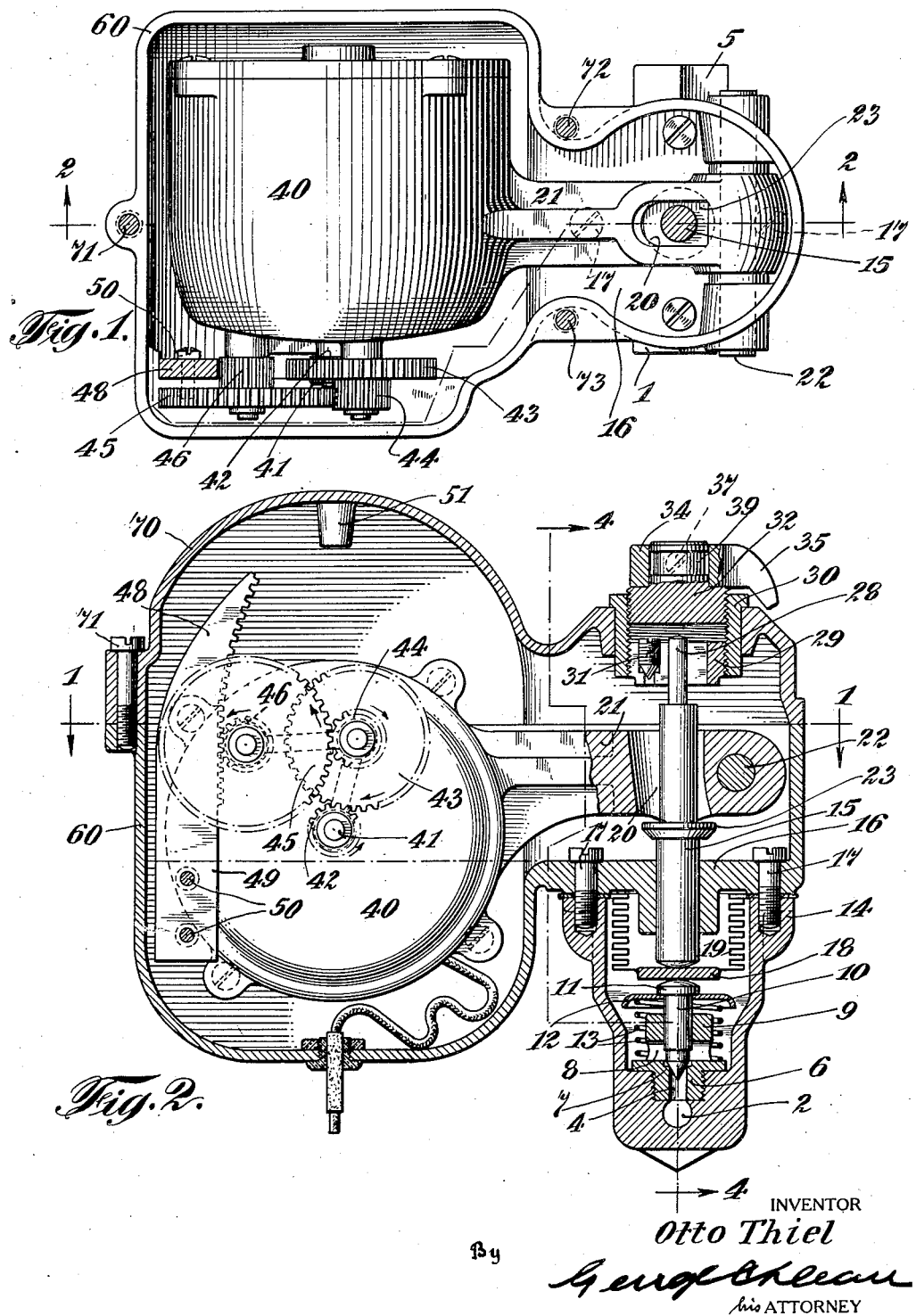

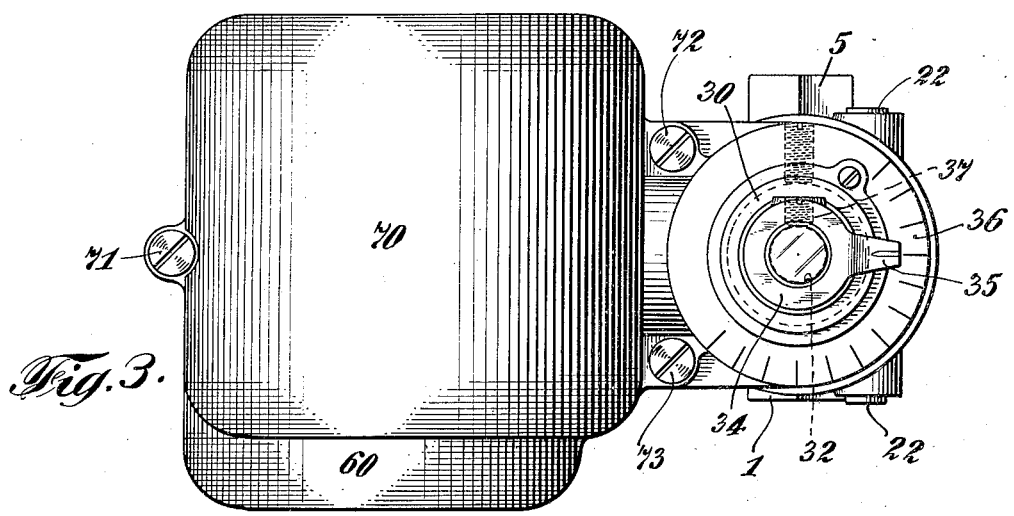
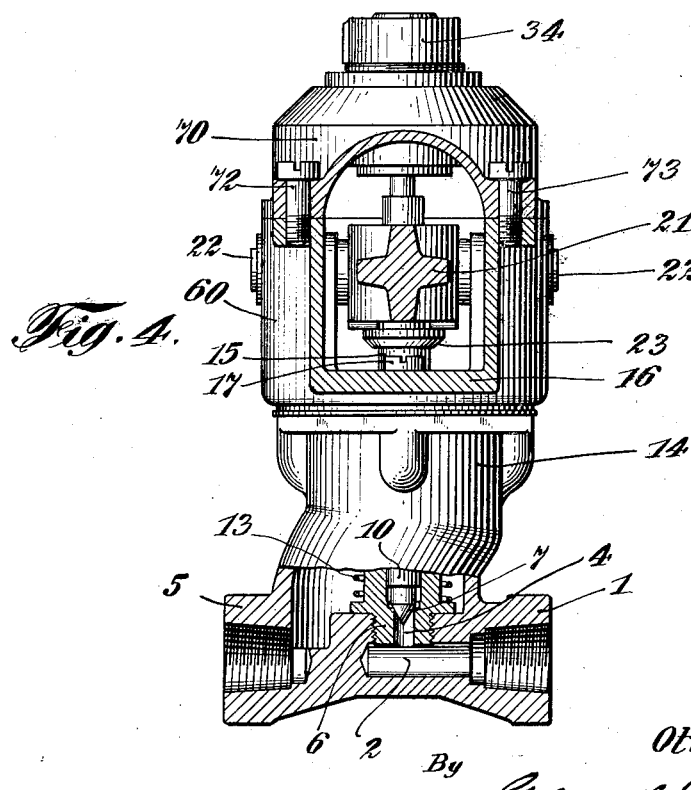

1,642,391

UNITED STATES PATENT OFFICE.

OTTO THIEL, OF DETROIT, MICHIGAN, ASSIGNOR TO SILENT AUTOMATIC CORPORATION, A CORPORATION OF MICHIGAN.

MOTOR-CONTROLLED VALVE.

Application filed June 11, 1926. Serial No. 115,237.

My invention is shown as embodied in a mechanism primarily intended for control of supply of fuel for an oil burner having the usual automatic controls, but the following description of its novel features will indicate that various features of the invention are applicable for distant control of other mechanisms or operations:

The object of the invention is to provide unfailing fool-proof control of the valve from a distance by means of a rotary electric motor located at the valve and arranged to open the same only when the motor is energized. Specifically considered, the electric motor is mounted on a valve-operating lever and the weight of the motor is relied on as gravity means for depressing the lever to close the valve, but the motor is geared to a stationary rack whereby it lifts itself against gravity to permit opening of the valve whenever the motor is energized. Preferably, the arrangement is such that the motor must be continuously energized so long as the valve is to be kept open and to this end the motor is so wound and energized that it can remain stalled in the elevated position to any desired length of time, without harm to the windings and without undue waste of energy.

The above and other features of my invention may be more fully understood from the following description in connection with the accompanying drawings, in which Fig. 1 is a top plan view, with the upper half of the enclosing case removed, on the line 1—1, Fig. 2;

Fig. 2 is a vertical section on the line 2—2, Fig. 1;

Fig. 3 is a top plan view with all parts assembled; and

Fig. 4 is a vertical section on the line 4—4, Fig. 2.

By reference to the lower part of Figs. 2 and 4, particularly the latter, it will be seen that the valve is arranged as a fitting to be inserted in a line, the threaded portion 1 being connected with the intake for supply of oil to the duct 2, usually by gravity, whence the path of flow of the oil is upward through duct 4 to the valve and downward from the valve to the screw-threaded exit bushing 5 that leads to the burner or other apparatus which is to be controllably supplied with the liquid.

A bushing, 6, affords a seat for valve 7, from which exit is through passage 8. This fitting also carries a guide, 9, for the stem or plunger, 10, of the valve, said plunger terminating in a head 11, the end face of which forms a shoulder for disc 12, affording a seat for a thrust spring 13 whereby the valve is normally urged to the upper or open position.

This valve is normally depressed to the closed position, against the thrust of spring 13 by means of a plunger, 15, guided in and extending upward through the lower wall of a casing member, 16, to which the valve casing 14 is secured by screws 17. The oil or other liquid in the valve chamber is cut off from contact with or leaking around this plunger by an intermediate metal plate or septum, 18, carried by a metallic bellows 19 arranged in a well known way to afford an expansible but liquid-tight closure for the valve cavity. The plunger, 15, extends upward through a clearance hole 20 in operating lever 21, which is pivoted at 22 and is gravity pressed against the collar 23 of plunger 15. The plunger has a reduced upper end, 28, slidably guided in a screw plug, 29, secured in a swivel sleeve 30, the securing means in the present case being a cone-tipped screw 31 adapted to expand the bushing 29, which is split as shown to permit springing open the slight distance necessary for this purpose.

The upper limit of lift of plunger 15 and consequently the maximum opening of the valve 7 by spring 13, is determined primarily by the position of screw plug 29. Below this limit, the upward movement and opening of the valve 7 may be accurately regulated from the exterior by the secondary limiting plug 32. To facilitate accurate adjustment for special purposes, I prefer to provide a reduced upper end for the plug 32, on which is secured a collar 34, provided with a radial index finger 35, adapted to move over the scale 36 (see Fig. 3). This index can be zeroed for any desired primary position of the plug 32 by loosening set screw 37, rotating the index finger to the desired position, without rotating the plug, and then securing it in said position by again tightening set screw 37. The groove, 39, will serve as a retaining swivel, engaged by the screw, during such setting operation.

From the above, it will be obvious that whenever the lever 21 is lifted, the valve will be opened by the spring 13 to an extent accurately predetermined by the setting of the plug 32, or plug 29.

The lever 21 carries at its outer end the electric motor 40, the casing and operating parts of which constitute automatic gravity operated means for closing the valve. For opening the valve, the armature shaft of the motor operates through a reducing gear whereby the motor lifts itself by rotation of its own armature. As shown, the armature shaft, 41, carries a pinion, 42, meshing with a gear, 43, rotating a pinion, 44, engaging a gear, 45, rotating a pinion, 46, and this latter pinion 46 engages a stationary rack, 48, which is concentric with the pivot of the lever at 22. This rack is on an upward extending bar, 49, fixed to the casing as by screws, 50.

The armature is wound and energized in a direction to drive its pinion 41 counter-clockwise, which causes rotation of the final pinion 46 in the same direction, at greatly reduced speed. The rack, 48, being stationary, such rotation necessarily causes pinion 46 to climb the rack and carry with it the entire motor structure and the lever on which it is mounted, until the casing of the motor engages a stud, 51, on the frame of the machine, whereupon the motor will be stalled but, its field and armature remaining energized, it will hold the upper position until the circuit is broken, whereupon the gravity will immediately restore the motor to the normal valve closing position shown in Fig. 2. Any such descent of the weight, the pinion 46, being still enmeshed with the rack, will drive the armature backward at multiple speed, thereby affording a dynamic break to regulate the speed of fall of the motor, without in any manner imparing the effectiveness of gravity in forcing certain completion of the downward movement. It will be obvious that this is because the breaking effect is mainly dynamic and becomes less and less as the speed of the fall decreases and therefore decreases to practically zero, as the speed of the movement decreases.

My invention thus provides unfailing means for gravity closure of the valve whenever the current to the motor is cut off either by the control mechanism or by accident.

A minor mechanical feature of the invention is the division of the casing horizontally into a lower main section, 60, and an upper cover section, 70, whereby removal of the securing screws 71, 72, 73, will give access to the motor and its operating parts while removal of screws 17 will permit access to the valve.

While I have referred to the motor as lifting its own weight, it will be evident that such expression both in the above description and in the following claims has a qualified meaning. That is to say, the total weight of the motor is carried partly by the pivot 22 and the weight actually lifted by the pinion 46 is only a proportional part of the total weight of the motor. Conversely, when the motor is deenergized, the effective weight of the motor, as concerns valve closing effort, is multiplied by the favorable leverage. For the proportions shown in the drawings, this would give something like a six to one ratio of multiplication of the motor weight for valve closing purposes.

I claim:

1. A conduit, a valve for controlling flow of fluid therein and means including a lever for controlling opening and closing of the valve, in combination with an electric motor arranged as a weight for closing the valve and means driven by the armature shaft of said motor to lift the same.

2. A conduit, a valve for controlling flow of fluid therein and means including an upwardly movable member for controlling opening and closing of the valve, said member carrying an electric motor arranged as a weight for closing the valve and means driven by the armature shaft of said motor to lift the same.

3. A conduit and means controlling flow of fluid therein, including a valve and an electric motor associated therewith as a weight for closing the valve and means whereby energizing of the motor causes it to lift its own weight to permit opening of said valve, said means including a train of reducing gears rotated by the armature shaft of the motor, the final gear of said train being permanently engaged with a stationary rack for multiplied lifting effect when said motor is energized and for dynamic breaking effect in fall of said motor when it is deenergized.

4. A conduit, a valve for controlling flow of fluid therein, yieldable means normally tending to hold said valve in the open position, an adjustable abutment for limiting the extent of movement toward said open position, in combination with gravity operated mechanism operating with greater force in the opposite direction to hold said valve in the closed position and electrically controlled means for permitting said valve to open to the full extent permitted by said adjustable abutment, said closing means including a lever carrying a rotary electric motor, the weight of which closes the valve and means actuated by the armature shaft of the motor whereby rotation of said shaft lifts said motor and lever.

5. A conduit, a valve for controlling flow of fluid therein, yieldable means normally tending to hold said valve in the open position, an adjustable abutment for limiting the extent of movement toward said open position, in combination with gravity operated mechanism operating with greater force in the opposite direction to hold said valve in the closed position and electrically controlled means for permitting said valve to open to the full extent permitted by said adjustable abutment, said closing means including a lever carrying an electric motor, the weight of which closes the valve and means actuated by the armature shaft of the motor whereby rotation of said shaft lifts said motor and lever high enough to open said valve to the full extent permitted by the abutment.

6. A conduit, a valve for controlling flow of fluid therein, yieldable means normally pressing said valve toward the open position, an adjustable abutment for positively limiting the extent of the opening movement, and other yieldable means normally applying greater thrust in the opposite direction to hold said valve normally closed against the thrust of said first mentioned yieldable means, in combination with means for opening said valve, including a movably mounted rotary electric motor, means actuated by the armature shaft of the motor whereby rotation of said shaft moves said motor, and a stop whereby such movement is limited and the motor is stalled to hold the valve in the open position until said motor is deenergized.

7. A valve, in combination with means for opening said valve, including a movably mounted rotary electric motor, means actuated by the armature shaft of the motor whereby rotation of said shaft moves said motor, and a stop whereby such movement is limited and the motor is stalled to hold the valve in the open position until said motor is deenergized.

Signed at Detroit, in the county of Wayne, and State of Mich., this 8th day of June, A. D. 1926.

OTTO THIE...